US010505848B2

(12) United States Patent
Underwood et al.

(10) Patent No.: US 10,505,848 B2
(45) Date of Patent: Dec. 10, 2019

(54) CONGESTION MANAGEMENT TECHNIQUES FOR COMMUNICATION NETWORKS

(71) Applicant: INTEL CORPORATION, Santa Clara, CA (US)

(72) Inventors: Keith D. Underwood, Powell, TN (US); Charles A. Giefer, Seattle, WA (US); David Addison, Issaquah, WA (US); Nathan S. Miller, Seattle, WA (US); Karl P. Brummel, Chicago, IL (US); Stephanie L. Hirnak, Bedford, NH (US); Eric R. Borch, Fort Collins, CO (US)

(73) Assignee: INTEL CORPORATION, Santa Clara, CA (US)

( * ) Notice: Subject to any disclaimer, the term of this patent is extended or adjusted under 35 U.S.C. 154(b) by 390 days.

(21) Appl. No.: 14/998,301

(22) Filed: Dec. 24, 2015

(65) Prior Publication Data

US 2017/0187630 A1      Jun. 29, 2017

(51) Int. Cl.
| | |
|---|---|
| *H04L 12/803* | (2013.01) |
| *H04L 12/823* | (2013.01) |
| *H04L 12/805* | (2013.01) |
| *H04L 12/911* | (2013.01) |
| *H04L 12/841* | (2013.01) |
| *H04W 28/02* | (2009.01) |

(52) U.S. Cl.
CPC ............ *H04L 47/125* (2013.01); *H04L 47/28* (2013.01); *H04L 47/32* (2013.01); *H04L 47/36* (2013.01); *H04L 47/741* (2013.01); *H04W 28/0289* (2013.01)

(58) Field of Classification Search
CPC ..... H04L 47/125; H04L 47/741; H04L 47/28; H04L 47/32; H04L 47/36; H04W 28/0289
See application file for complete search history.

(56) References Cited

U.S. PATENT DOCUMENTS

| | | | |
|---|---|---|---|
| 2003/0069927 A1* | 4/2003 | Malrnskog | ............. H04L 29/06 709/203 |
| 2004/0258040 A1 | 12/2004 | Joshi et al. | |
| 2005/0089002 A1 | 4/2005 | Shin et al. | |
| 2005/0105532 A1* | 5/2005 | Yun | ......................... H04L 47/10 370/395.21 |

(Continued)

OTHER PUBLICATIONS

International Search Report and Written Opinion received for PCT Patent Application No. PCT/US2016/063765, dated Mar. 15, 2017, 13 pages.

*Primary Examiner* — Kwang B Yao
*Assistant Examiner* — Moo Jeong

(57) ABSTRACT

Congestion management techniques for communication networks are described. In an example embodiment, an apparatus may comprise circuitry, a communication component for execution by the circuitry to receive a send request identifying a message to be received from an initiator device via a packet transfer process and transmit an acceptance to grant the send request, and a scheduling component for execution by the circuitry to determine whether to defer the packet transfer process and in response to a determination to defer the packet transfer process, select a value of a delay parameter to be included in the acceptance. Other embodiments are described and claimed.

25 Claims, 10 Drawing Sheets

(56) References Cited

U.S. PATENT DOCUMENTS

| | | | |
|---|---|---|---|
| 2005/0254423 A1* | 11/2005 | Berghoff | H04L 47/10 370/230.1 |
| 2007/0041364 A1* | 2/2007 | Kakadia | H04L 45/00 370/352 |
| 2010/0232427 A1 | 9/2010 | Matsushita et al. | |
| 2011/0242974 A1* | 10/2011 | Das | H04L 47/781 370/230 |
| 2013/0229907 A1 | 9/2013 | Wen et al. | |
| 2015/0043335 A1* | 2/2015 | Testicioglu | H04L 45/48 370/230 |
| 2015/0288611 A1* | 10/2015 | Fan | H04W 76/00 370/280 |
| 2015/0334701 A1 | 11/2015 | Agardh et al. | |
| 2017/0078206 A1* | 3/2017 | Huang | H04L 47/193 |

* cited by examiner

US 10,505,848 B2

CONGESTION MANAGEMENT TECHNIQUES FOR COMMUNICATION NETWORKS

GOVERNMENT RIGHTS

This invention was made with Government support under contract number H98230-13-D-0124 awarded by the Department of Defense. The Government has certain rights in this invention.

TECHNICAL FIELD

Embodiments herein generally relate to communications between computing devices in communication networks.

BACKGROUND

In order to exchange messages with each other, applications running on different computing devices in a communication network may make use of application-layer connectivity provided by a connectivity fabric of that communication network. At the transport layer, a message being sent from an initiator device to a target device may be segmented at the initiator, and the segments may be encapsulated in packets for transmission to the target during a packet transfer process. If multiple devices send messages to a target device, multiple packet transfer processes may concurrently pend at the target device.

DETAILED DESCRIPTION

Various embodiments may be generally directed to congestion management techniques for communication networks. In an example embodiment, an apparatus may comprise circuitry, a communication component for execution by the circuitry to receive a send request identifying a message to be received from an initiator device via a packet transfer process and transmit an acceptance to grant the send request, and a scheduling component for execution by the circuitry to determine whether to defer the packet transfer process and in response to a determination to defer the packet transfer process, select a value of a delay parameter to be included in the acceptance. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
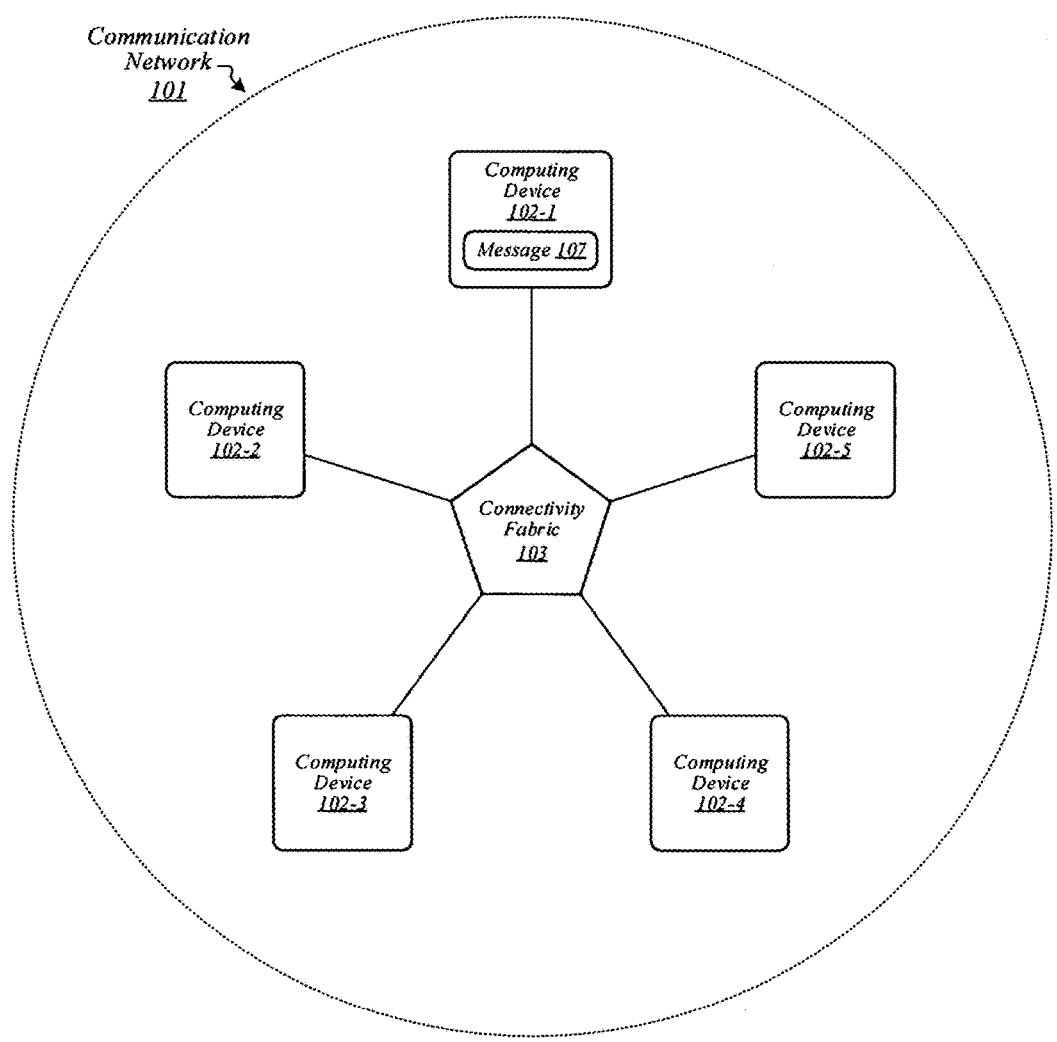
FIG. 1 illustrates an embodiment of a first operating environment.

FIG. 1 illustrates an example of an operating environment 100 that may be representative of various embodiments. In operating environment 100, a communication network 101 comprises a plurality of computing devices 102-1 to 102-5. In some embodiments, a connectivity fabric 103 of communication network 101 may generally enable communication among computing devices 102-1 to 102-5. In various embodiments, in the context of the application layer, connectivity fabric 103 may generally enable the use of application-layer send operations to send messages for receipt via application-layer receive operations. In the example of FIG. 1, computing device 102-1 may use a send operation to send a message 107 to computing device 102-5 via connectivity fabric 103, and computing device 102-5 may use a receive operation to receive message 107 from computing device 102-1 via connectivity fabric 103. The embodiments are not limited to this example.

Figure 2:
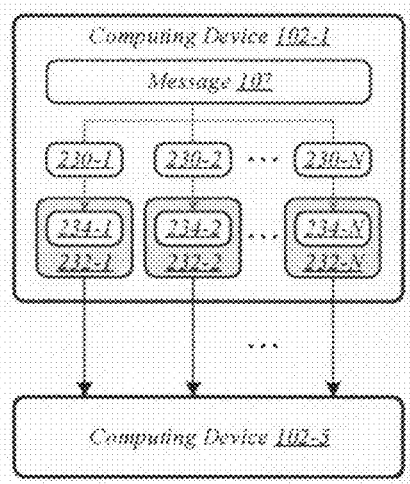
FIG. 2 illustrates an embodiment of a second operating environment.

FIG. 2 illustrates an example of an operating environment 200 that may be representative of some embodiments. In operating environment 200, in order to send message 107 to computing device 102-5, computing device 102-1 may partition some or all of message 107 into a plurality of data segments 230-1 to 230-N, where N is an integer greater than 1. In various embodiments, computing device 102-1 may then send each one of the plurality of data segments 230-1 to 230-N to computing device 102-5 in a separate respective one of packets 232-1 to 232-N. In some embodiments, each one of packets 232-1 to 232-N may comprise a respective one of payloads 234-1 to 234-N, each of which may contain the data segment to be carried by its associated packet. In various embodiments, computing device 102-5 may receive packets 232-1 to 232-N, extract data segments 230-1 to 230-N from respective payloads 234-1 to 234-N, and reconstruct message 107 using data segments 230-1 to 230-N. The embodiments are not limited to this example.

Figure 3:
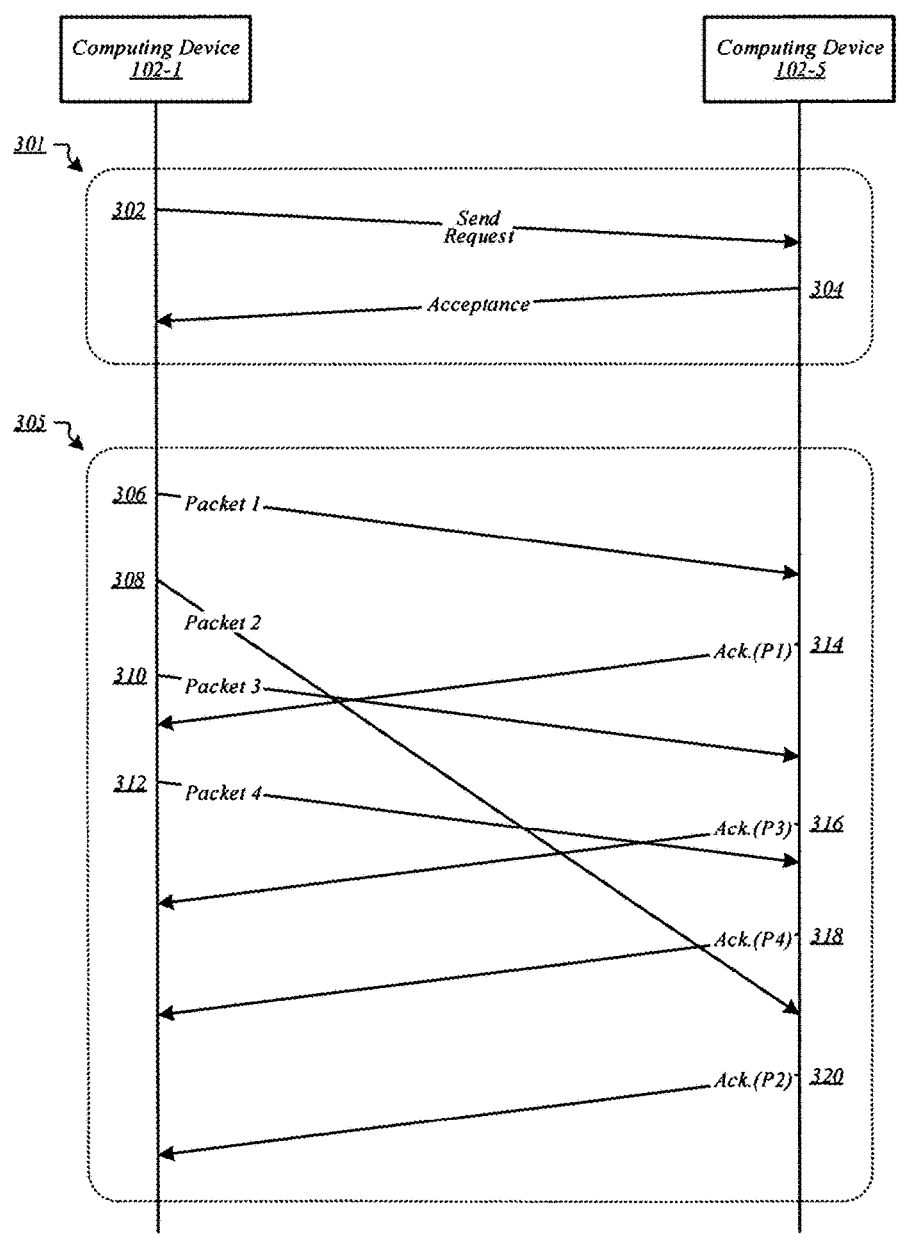
FIG. 3 illustrates an embodiment of a communication flow.

FIG. 3 illustrates an example of a communications flow 300 that may be representative of a series of communications that may be exchanged between computing devices 102-1 and 102-5 in some embodiments. In various embodiments, the communications that computing devices 102-1 and 102-5 exchange according to communications flow 300 may comprise transport-layer communications. In some embodiments, computing devices 102-1 and 102-5 may exchange such transport-layer communications in support of application-layer communications between computing devices 102-1 and 102-5. For example, communications flow 300 may be representative of communications that computing devices 102-1 and 102-5 may exchange in various embodiments in conjunction with the transmission of packets 212-1 to 212-N from computing device 102-1 to computing device 102-5 in operating environment 200 of FIG. 2, and packets 212-1 to 212-N may comprise the various segments of message 107. The embodiments are not limited to this example.

As shown in FIG. 3, communications flow 300 may begin at 302, where computing device 102-1 may transmit a send request to computing device 102-5. In some embodiments, this send request may generally comprise a request on the part of a transport-layer entity at computing device 102-1 to establish a transport-layer session with a transport-layer entity at computing device 102-5 and to send one or more packets to the transport-layer entity at computing device 102-5. At 304, computing device 102-5 may send an acceptance to computing device 102-1. In various embodiments, this acceptance may generally constitute an indication on the part of the transport-layer entity at computing device 102-5 that the transport-layer entity at computing device 102-1 may send the one or more packets as requested. In some embodiments, the send request transmitted at 302 may comprise a request-to-send (RTS), and the acceptance sent at 304 may comprise a clear-to-send (CTS). In various embodiments, the exchange of the send request and the acceptance may constitute a handshake 301. In some embodiments, handshake 301 may generally comprise a wire-level handshake between respective transport-layer entities at computing devices 102-1 and 102-5. In various embodiments, the completion of handshake 301 may establish a transport-layer session between the respective transport-layer entities at computing devices 102-1 and 102-5. The embodiments are not limited in this context.

In some embodiments, following receipt of the acceptance from computing device 102-5, computing device 102-1 may initiate a packet transfer process 305. In various embodiments, according to packet transfer process 305, computing device 102-1 may send packets 1, 2, 3, and 4 to computing device 102-5 at 306, 308, 310, and 312, respectively. In various embodiments, the respective payloads of packets 1, 2, 3, and 4 may each contain segments of an application-layer message such as message 107 of FIG. 2. In the context of operating environment 200 of FIG. 2, communications flow 300 may be representative of some embodiments in which N is equal to 4, such that message 107 is partitioned into four segments 230-1 to 230-4 which are delivered to computing device 102-5 in the respective payloads 234-1 to 234-4 of four packets 232-1 to 232-4. As reflected in FIG. 3, packets 1, 2, 3, and 4 may not necessarily arrive at computing device 102-5 in the same order as that in which they are sent by computing device 102-1. In the example depicted in FIG. 3, packet 2 is the second packet sent by computing device 102-1 but the last packet received by computing device 102-5. According to packet transfer process 305, at each of 314, 316, 318, and 320, computing device 102-5 may send an acknowledgment to acknowledge receipt of a respective one of packets 1, 2, 3, and 4. Namely, computing device 102-5 may send a first acknowledgment at 314 to acknowledge packet 1, a second acknowledgment at 316 to acknowledge packet 3, a third acknowledgment at 318 to acknowledge packet 4, and a fourth acknowledgment at 320 to acknowledge packet 2. The embodiments are not limited to this example.

Figure 4:
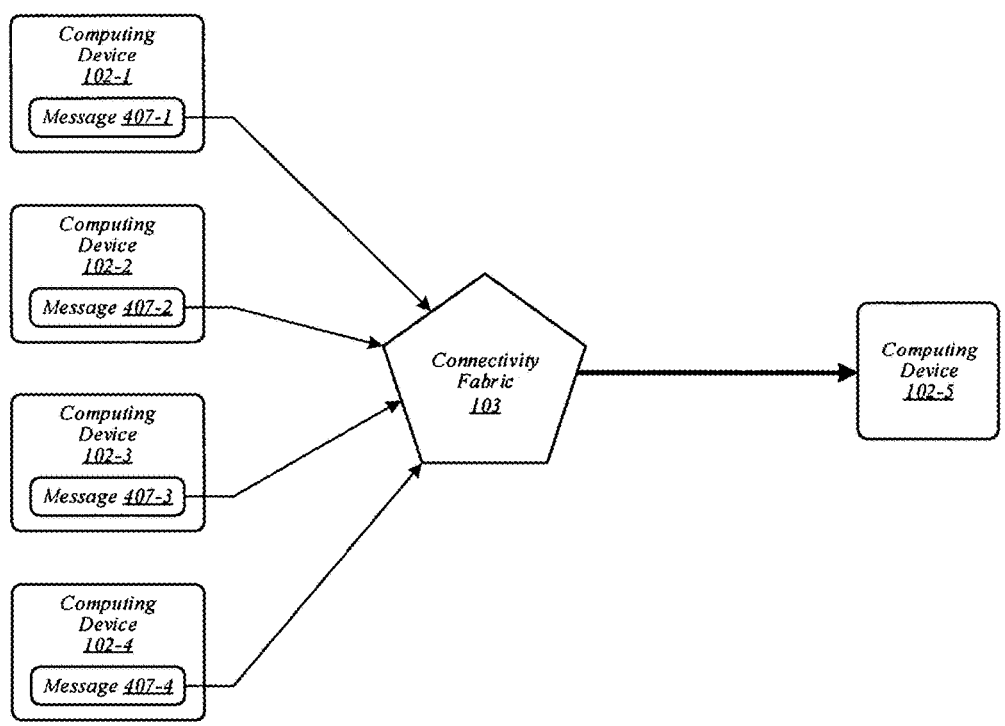
FIG. 4 illustrates an embodiment of a third operating environment.

FIG. 4 illustrates an example of an operating environment 400 that may be representative of various embodiments. For example, operating environment 400 may be representative of some embodiments in which multiple devices in communication network 101 of FIG. 1 send messages to computing device 102-5. In operating environment 400, computing devices 102-1, 102-2, 102-3, and 102-4 send respective messages 407-1, 407-2, 407-3, and 407-4 to computing device 102-5. In various embodiments, each one of computing device 102-1 to 102-4 may initiate a packet transfer process in conjunction with sending its respective one of messages 407-1 to 407-4. In some embodiments, messages 407-1 to 407-4 may be sent concurrently, and respective packet transfer processes for those messages may be ongoing at the same time. In various embodiments, computing device 102-5 may be able to accommodate multiple ongoing packet transfer processes by interleaving its reception of the respective packets of those packet transfer processes. However, such interleaved reception may cause packets to back up into the network as they await delivery to computing device 102-5, potentially resulting in network congestion.

Disclosed herein are congestion management techniques that may be implemented in some embodiments in order to avoid or mitigate such network congestion. According to various such techniques, a target device may be provided with the option of deferring a packet transfer process for a message to be received from any given initiator device. In some embodiments, following receipt of a send request from the initiator device, the target device may determine whether to defer the packet transfer process based on a receive schedule that generally identifies ongoing and scheduled packet transfer processes of the target device. In various embodiments, if the receive schedule indicates that immediate initiation of the packet transfer process will necessitate interleaved reception on the part of the target device, the target device may elect to defer the packet transfer process. In some embodiments, following a determination to defer the packet transfer process, the target device may select a value of a delay parameter, which may be included in an acceptance sent to the initiator device in order to grant the send request. In various embodiments, the initiator device may delay initiation of the packet transfer process based on the delay parameter. The embodiments are not limited in this context.

Figure 5:
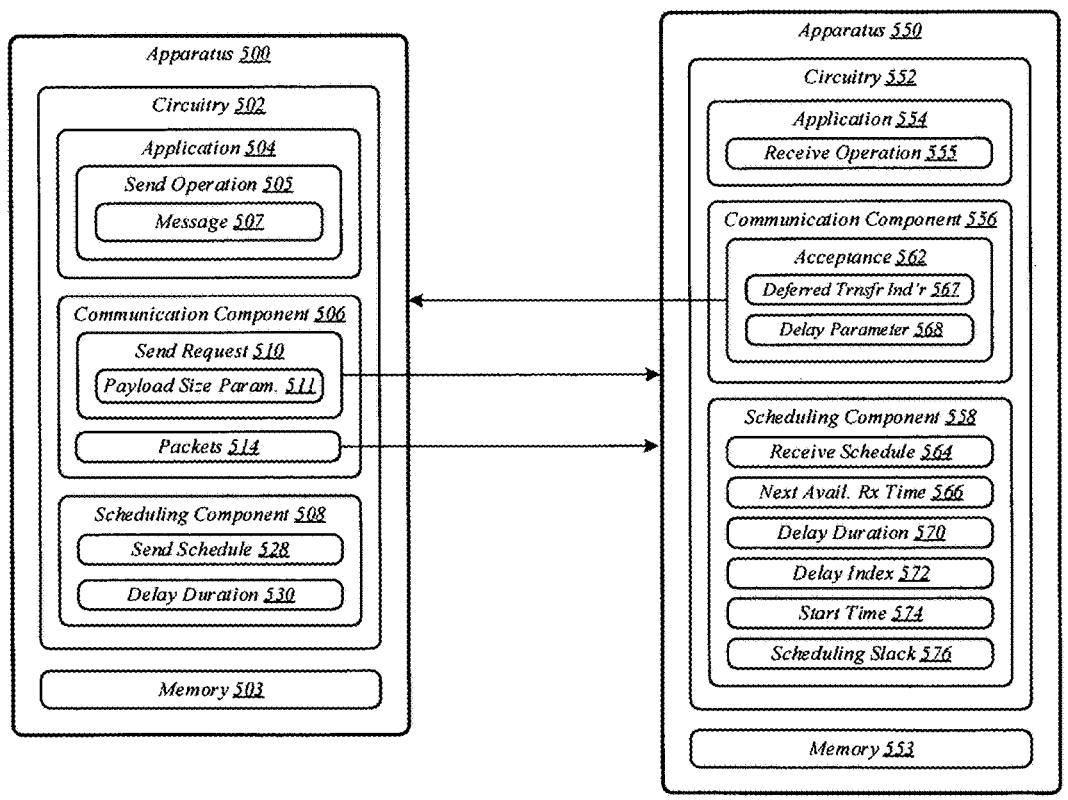
FIG. 5 illustrates an embodiment of a first apparatus and an embodiment of a second apparatus.

FIG. 5 illustrates examples of apparatuses 500 and 550 that may be representative of apparatuses that may implement one or more of the disclosed congestion management techniques according to some embodiments. Apparatus 500 may generally be representative of an initiator device that sends an application-layer message and apparatus 550 may generally be representative of a target device that receives that application-layer message. According to various embodiments, apparatus 500 may be representative of computing device 102-1 of FIGS. 1-4, and apparatus 550 may be representative of computing device 102-5 of FIGS. 1-4. As shown in FIG. 5, both of apparatuses 500 and 550 comprise multiple elements, including respective circuitry 502 and 552 and respective memories 503 and 553. The embodiments, however, are not limited to the type, number, or arrangement of elements shown in this figure.

In some embodiments, apparatuses 500 and 550 may comprise respective circuitry 502 and 552. Circuitry 502 and circuitry 552 may both be arranged to execute one or more software or firmware implemented modules or components, which may include respective communication components 506 and 556 and respective scheduling components 508 and 558. In various embodiments, either or both of circuitry 502 and circuitry 552 may comprise circuitry of a processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). In some embodiments, either or both of circuitry 502 and circuitry 552 may comprise circuitry of a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In various embodiments, either or both of circuitry 502 and circuitry 552 may be implemented using any of various commercially available processors, including—without limitation—AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. The embodiments are not limited in this context.

In various embodiments, apparatuses 500 and 550 may comprise or be arranged to communicatively couple with respective memories 503 and 553. Either or both of memories 503 and 553 may be implemented using any machine-readable or computer-readable media capable of storing data, including both volatile and non-volatile memory. For example, either or both of memories 503 and 553 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memories 503 and 553 may be included on the same respective integrated circuits as circuitry 502 and circuitry 552, or alternatively some portion or all of memories 503 and 553 may be disposed on integrated circuits or other media, for example hard disk drives, that are external to the respective integrated circuits of circuitry 502 and circuitry 552. Although memories 503 and 553 are comprised within respective apparatuses 500 and 550 in FIG. 5, memories 503 and 553 may be external to respective apparatuses 500 and 550 in some embodiments. The embodiments are not limited in this context.

In some embodiments, communication component 506 may be executed by circuitry 502 to generally manage communications between apparatus 500 and one or more remote devices. In various embodiments, communication component 556 may be executed by circuitry 552 to generally manage communications between apparatus 550 and one or more remote devices. In some embodiments, communication components 506 and 556 may be operative to send and/or receive messages in a communication network, such as communication network 101 of FIG. 1. In various embodiments, communications components 506 and 556 may additionally comprise logic, circuitry, and/or instructions operative to perform various operations in support of such communications. Examples of such operations may include—without limitation—selection of transmission and/or reception parameters and/or timing, packet and/or protocol data unit (PDU) construction and/or deconstruction, encoding and/or decoding, error detection, and/or error correction. The embodiments are not limited to these examples.

In some embodiments, scheduling component 508 may be executed by circuitry 502 to maintain scheduling information in support of communications performed by communication component 506. In various embodiments, scheduling component 558 may be executed by circuitry 552 to maintain scheduling information in support of communications performed by communication component 556. In some embodiments, scheduling components 508 and 558 may maintain scheduling information for various packet transfer processes via which respective communication components 506 and 556 may send and/or receive packets. The embodiments are not limited in this context.

In some embodiments, circuitry 502 may execute an application 504 at apparatus 500, and circuitry 552 may execute an application 554 at apparatus 550. In various embodiments, applications 504 and 554 may comprise respective instances of a same application. In some other embodiments, applications 504 and 554 may comprise different applications. In various embodiments, application-layer connectivity between apparatuses 500 and 550 may generally enable applications 504 and 554 to send application-layer messages to each other. In some embodiments, application 504 may use a send operation 505 to send a message 507 to application 554, and application 554 may use a receive operation 555 to receive that message 507. In various embodiments, message 507 may be the same as—or similar to—one or more of messages 107, 407-1, 407-2, 407-3, and 407-4 of FIGS. 1, 2, and 4. In some embodiments, in order to enable message 507 to be conveyed to apparatus 550, communication component 506 may partition message 507 into a plurality of data segments. In various embodiments, communication component 506 may encapsulate each such data segment within a respective one of a plurality of packets 514 to be sent to apparatus 550 via a packet transfer process. The embodiments are not limited in this context.

In some embodiments, communication component 506 may transmit a send request 510 to apparatus 550. In various embodiments, send request 510 may generally comprise a request to establish a packet transfer session with apparatus 550 in order to send packets 514 to apparatus 550. In some embodiments, send request 510 may identify message 507. In various embodiments, send request 510 may comprise a payload size parameter 511. In some embodiments, payload size parameter 511 may indicate a size of message 507. In various embodiments, communication component 506 may transmit send request 510 to apparatus 550 in conjunction with a handshake with apparatus 550. In some embodiments, the handshake may comprise a rendezvous protocol operation. In various embodiments, send request 510 may comprise a request-to-send (RTS). In some embodiments, send request 510 may be the same as—or similar to—the send request that is transmitted at 302 in communications flow 300 of FIG. 3. The embodiments are not limited in this context.

In various embodiments, communication component 556 may receive send request 510 at apparatus 550. In some embodiments, following the receipt of send request 510, scheduling component 558 may determine whether to defer the packet transfer process via which apparatus 550 is to receive packets 514 from apparatus 500. In various embodiments, scheduling component 558 may determine whether to defer the packet transfer process based on a receive schedule 564. In some embodiments, receive schedule 564 may generally comprise information identifying any packet transfer processes that are ongoing or scheduled at apparatus 550. In various embodiments, if receive schedule 564 indicates that there are no packet transfer processes ongoing or scheduled at apparatus 550, scheduling component 558 may determine not to defer the packet transfer process for message 507. In some embodiments, if receive schedule 564 indicates that one or more packet transfer processes are ongoing at apparatus 550 and/or that one or more packet transfer processes are scheduled, scheduling component 558 may determine whether to defer the packet transfer process for message 507 based on whether immediate initiation of that packet transfer process may be expected to result in network congestion. In various embodiments, for example, scheduling component 558 may determine whether to defer the packet transfer process for message 507 based on whether immediate initiation of that packet transfer process will necessitate interleaved reception by communication component 556 of packets associated with multiple messages. The embodiments are not limited to this example.

In some embodiments, following a determination to defer the packet transfer process for message 507, scheduling component 558 may select a receive interval for that packet transfer process. In various embodiments, the receive interval may generally comprise a future time interval during which the packet transfer process is to be performed. In some embodiments, scheduling component 558 may determine a size of message 507 based on payload size parameter 511, and may select the receive interval based on the size of message 507. In various embodiments, scheduling component 558 may select the receive interval based on the size of message 507 and on receive schedule 564. For example, in some embodiments, based on receive schedule 564, scheduling component 558 may determine a next available receive time 566, may use the next available receive time 566 as a start time of the receive interval, and may determine an end time of the receive interval based on the size of message 507. In various embodiments, next available receive time 566 may comprise a next point in time at which initiation of the packet transfer process for message 507 will not necessitate interleaved reception. The embodiments are not limited in this context.

In some embodiments, in response to a determination to defer the packet transfer process for message 507, scheduling component 558 may select a value of a delay parameter 568, and communication component 556 may grant send request 510 by transmitting an acceptance 562 comprising that delay parameter 568. In various embodiments, communication component 556 may receive send request 510 from apparatus 500 and transmit acceptance 562 to apparatus 500 in conjunction with a handshake with apparatus 500. In some embodiments, the handshake may comprise a rendezvous protocol operation. In various embodiments, acceptance 562 may comprise a clear-to-send (CTS). In some embodiments, acceptance 562 may be the same as—or similar to—the acceptance that is transmitted at 304 in communications flow 300 of FIG. 3. The embodiments are not limited in this context.

In various embodiments, delay duration 570 may generally comprise an amount of time by which the initiation of that packet transfer process is to be delayed. In some embodiments, scheduling component 558 may determine delay duration 570 as a difference between next available receive time 566 and a current time. In various embodiments, scheduling component 558 may select the value of delay duration 570 as the value of delay parameter 568. In some other embodiments, scheduling component 558 may select a delay index 572 based on delay duration 570, and may select the value of delay index 572 as the value of delay parameter 568. In various embodiments, the selected delay index 572 may comprise one of a set of defined delay indices, each of which is defined to indicate a respective duration. The embodiments are not limited in this context.

In some embodiments, scheduling component 558 may select a start time 574 for the packet transfer process for message 507. In various embodiments, start time 574 may comprise a time at which apparatus 500 is to initiate that packet transfer process. In some embodiments, start time 574 may comprise a specific future point in time. In various embodiments, start time 574 may comprise a specific future point in time according to a timing reference available to both apparatus 500 and apparatus 550. In some embodiments, for example, start time 574 may comprise a specific future point in time according to a globally synchronized timing reference for a communication network via which apparatuses 500 and 550 communicate. In various embodiments, scheduling component 558 may use start time 574 itself as the value of delay parameter 568. In some other embodiments, scheduling component 558 may select delay duration 570 based on start time 574, and may use the value of delay duration 570 or the value of a corresponding selected delay index 572 as the value of delay parameter 568. The embodiments are not limited in this context.

In various embodiments, in conjunction with any of the aforementioned approaches, scheduling component 558 may select a scheduling slack 576 to be observed to conjunction with the selection of delay parameter 568. In some embodiments, scheduling slack 576 may generally comprise a marginal amount of delay time to be factored into the selection of delay parameter 568 in order to account for uncertainty with respect to the timings of various communications and/or operations of apparatuses 500 and 550. In various embodiments, for example, scheduling component 558 may apply scheduling slack 576 to account for variability with respect to the amount of time required for acceptance 562 to reach apparatus 500. In another example, in some embodiments, scheduling component 558 may apply scheduling slack 576 to account for variability with respect to the amounts of time required for the various packets 514 to reach apparatus 550. It is worthy of note that scheduling slack 576 may indicate a positive marginal amount of delay time in some embodiments, and may indicate a negative marginal amount of delay time in other embodiments. The embodiments are not limited in this context.

In various embodiments, communication component 556 may only include delay parameter 568 in acceptance 562 if scheduling component 558 determines to defer the packet transfer process for message 507. In some such embodiments, the presence of delay parameter 568 in acceptance 562 may in and of itself comprise an indication that the packet transfer process is to be delayed. In various other embodiments, communication component 556 may include delay parameter 568 in acceptance 562 regardless of whether scheduling component 558 determines to defer the packet transfer process, and the value of delay parameter 568 may indicate whether the packet transfer process is to be delayed. In some such embodiments, in the event that scheduling component 558 elects not to defer the packet transfer process, delay parameter 568 may be set to zero, or to some other value defined to indicate that the packet transfer process is to be initiated without delay. In various embodiments, communication component 556 may include a deferred transfer indicator 567 in acceptance 562 in order to indicate that the packet transfer process is to be delayed. In some embodiments, communication component 556 may include deferred transfer indicator 567 by setting a flag, bit, field, parameter value, or other type of information element within acceptance 562. The embodiments are not limited in this context.

In various embodiments, communication component 506 may receive acceptance 562 at apparatus 500, and scheduling component 508 may determine whether acceptance 562 indicates that the packet transfer process for message 507 is to be deferred. In some embodiments, scheduling component 508 may determine whether the packet transfer process is to be deferred based on whether delay parameter 568 is present within acceptance 562. In various other embodiments, scheduling component 508 may determine whether the packet transfer process is to be deferred based on the value of delay parameter 568. In yet other embodiments, scheduling component 508 may determine whether the packet transfer process is to be deferred based on whether deferred transfer indicator 567 is present in acceptance 562. The embodiments are not limited in this context.

In some embodiments, in response to a determination that acceptance 562 indicates that the packet transfer process for message 507 is to be deferred, scheduling component 508 may delay initiation of that packet transfer process based on delay parameter 568. In various embodiments, scheduling component 508 may identify a delay duration 530 based on delay parameter 568 and delay the initiation of the packet transfer process by the identified delay duration 530. In some embodiments, the value of delay duration 530 may be the same as the value of delay duration 570. For example, in various embodiments, scheduling component 558 may use the value of delay duration 570 as the value of delay parameter 568, and scheduling component 508 may identify the value of delay parameter 568 as delay duration 530. In some other embodiments, the value of delay duration 530 may differ from that of delay duration 570. In various embodiments, the value of delay parameter 568 may comprise that of delay index 572, and scheduling component 508 may identify the value of delay index 572 based on that of delay parameter 568. In some such embodiments, scheduling component 508 may then identify delay duration 530 as a value corresponding to delay index 572. In various embodiments, delay parameter 568 may comprise the value of start time 574, and scheduling component 508 may identify start time 574 based on delay parameter 568. In some such embodiments, scheduling component 508 may defer the initiation of the packet transfer process until start time 574. In various embodiments, scheduling component 508 may update a send schedule 528 based on delay duration 530 or start time 574, so that the packet transfer process will be properly deferred according to the updated send schedule 528. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 6:
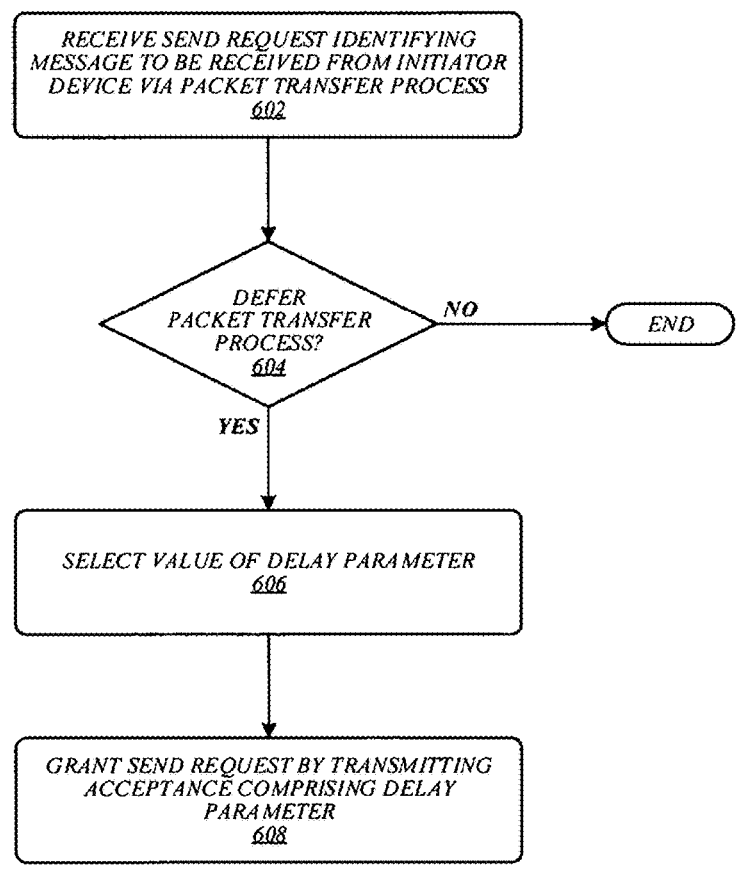
FIG. 6 illustrates an embodiment of a first logic flow.

FIG. 6 illustrates an example of a logic flow 600 that may be representative of the implementation of one or more of the disclosed congestion management techniques according to some embodiments. For example, logic flow 600 may be representative of operations that may be performed in some embodiments by circuitry 552 in apparatus 550 of FIG. 5. As shown in FIG. 6, a send request may be received at 602 that identifies a message to be received from an initiator device via a packet transfer process. For example, communication component 556 of FIG. 5 may receive send request 510, which may identify message 507. At 604, it may be determined whether to defer the packet transfer process. For example, scheduling component 558 of FIG. 5 may determine whether to defer the packet transfer process for message 507 based on receive schedule 564. If it is determined at 604 that the packet transfer process is not to be deferred, the logic flow may end. If it is determined at 604 that the packet transfer process is to be deferred, flow may pass to 606. At 606, a value of a delay parameter may be selected. For example, scheduling component 558 of FIG. 5 may select a value of delay parameter 568. At 608, the send request may be granted by transmitting an acceptance comprising the delay parameter. For example, communication component 556 of FIG. 5 may grant send request 510 by sending acceptance 562, which may comprise delay parameter 568. The embodiments are not limited to these examples.

Figure 7:
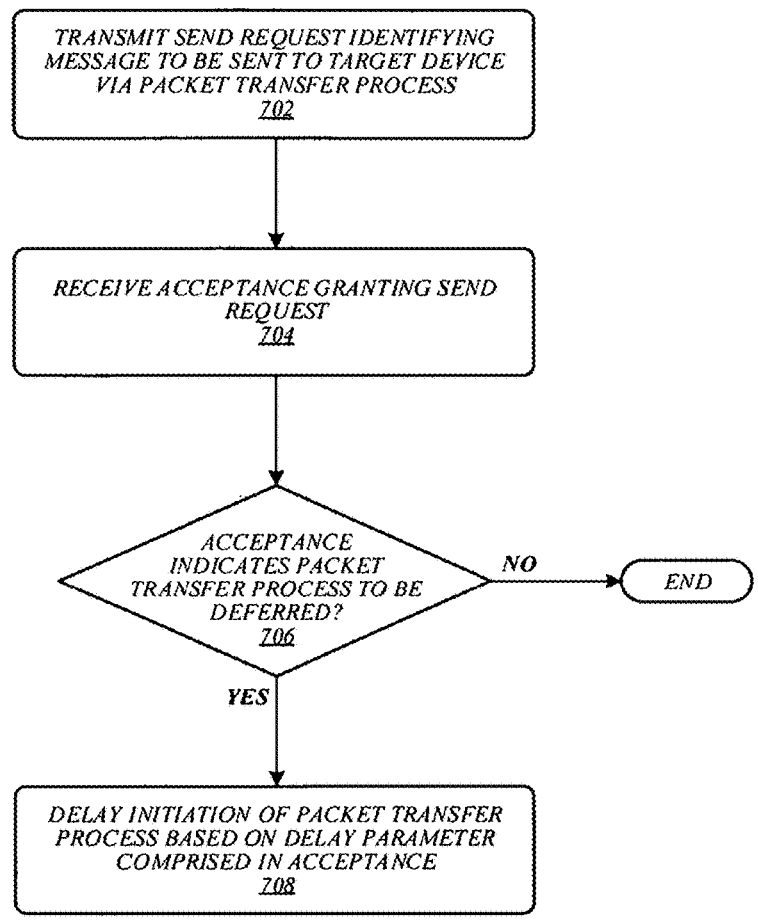
FIG. 7 illustrates an embodiment of a second logic flow.

FIG. 7 illustrates an example of a logic flow 700 that may be representative of the implementation of one or more of the disclosed congestion management techniques according to some embodiments. For example, logic flow 700 may be representative of operations that may be performed in some embodiments by circuitry 502 in apparatus 500 of FIG. 5. As shown in FIG. 7, a send request may be transmitted at 702 that identifies a message to be sent to a target device via a packet transfer process. For example, communication component 506 of FIG. 5 may transmit send request 510, which may identify message 507. At 704, an acceptance may be received that grants the send request. For example, communication component 506 of FIG. 5 may receive acceptance 562. At 706, it may be determined whether the acceptance indicates that the packet transfer process is to be deferred. If it is determined at 706 that the acceptance does not indicate that the packet transfer process is to be deferred, the logic flow may end. If it is determined at 706 that the acceptance indicates that the packet transfer process is to be deferred, flow may pass to 708. At 708, an initiation of the packet transfer process may be delayed based on a delay parameter comprised in the acceptance. For example, scheduling component 508 of FIG. 5 may delay the initiation of the packet transfer process for message 507 based on a delay parameter 568 comprised in acceptance 562. The embodiments are not limited to these examples.

Figure 8:
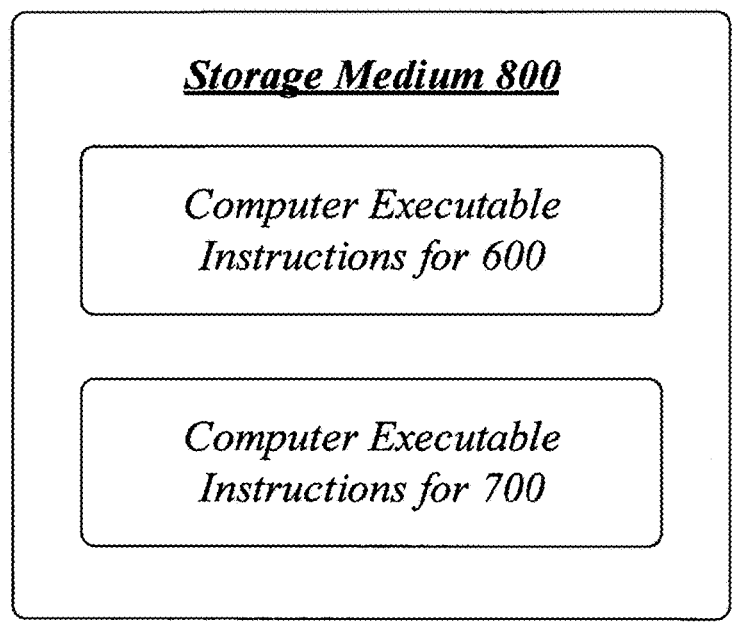
FIG. 8 illustrates an embodiment of a storage medium.

FIG. 8 illustrates an embodiment of a storage medium 800. Storage medium 800 may comprise any non-transitory computer-readable storage medium or machine-readable storage medium, such as an optical, magnetic or semiconductor storage medium. In various embodiments, storage medium 800 may comprise an article of manufacture. In some embodiments, storage medium 800 may store computer-executable instructions, such as computer-executable instructions to implement one or both of logic flow 600 of FIG. 6 and logic flow 700 of FIG. 7. Examples of a computer-readable storage medium or machine-readable storage medium may include any tangible media capable of storing electronic data, including volatile memory or non-volatile memory; removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 9:
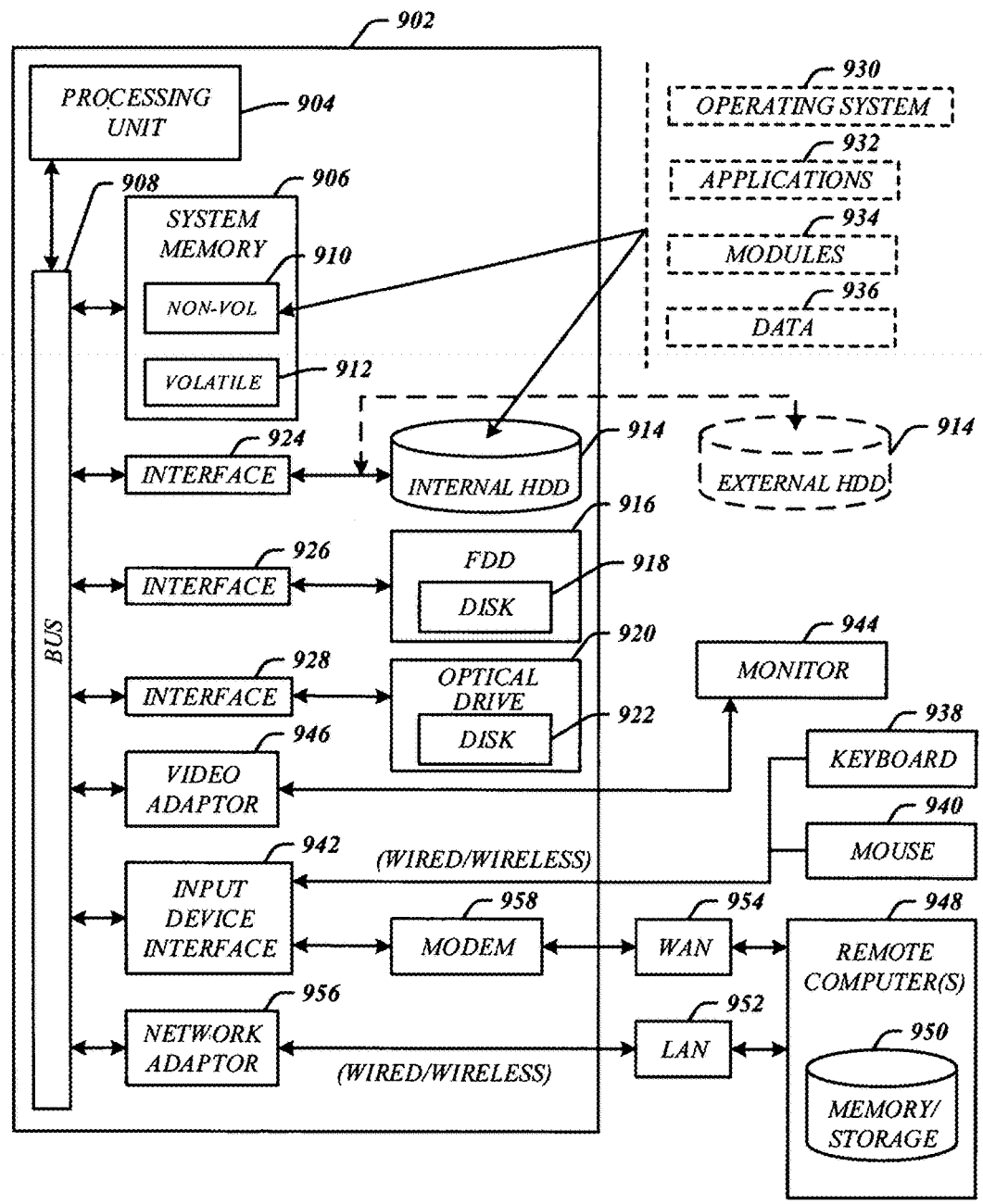
FIG. 9 illustrates an embodiment of a computing architecture.

FIG. 9 illustrates an embodiment of an exemplary computing architecture 900 suitable for implementing various embodiments as previously described. In various embodiments, the computing architecture 900 may comprise or be implemented as part of an electronic device. In some embodiments, the computing architecture 900 may be representative, for example, of either or both of apparatuses 500 and 550 of FIG. 5. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, various applications and/or components of either or both of apparatuses 500 and 550 of FIG. 5.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device also may be connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
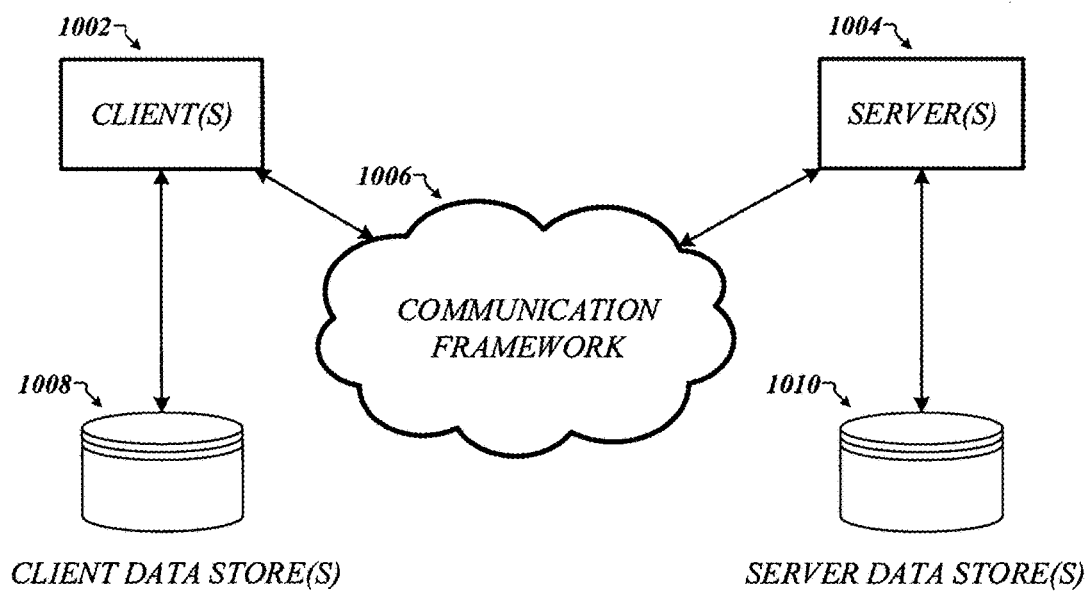
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 and the servers 1004 are operatively connected to one or more respective client data stores 1008 and server data stores 1010 that can be employed to store information local to the respective clients 1002 and servers 1004, such as cookies and/or associated contextual information. Any one of clients 1002 and/or servers 1004 may implement one or more of apparatus 500 and apparatus 550 of FIG. 5, logic flow 600 of FIG. 6, logic flow 700 of FIG. 7, storage medium 800 of FIG. 8, and computing architecture 900 of FIG. 9. In various embodiments, either or both of apparatuses 500 and 550 of FIG. 5 may be implemented in one or more switching devices and/or routing devices in communication framework 1006.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

One or more aspects of at least one embodiment may be implemented by representative instructions stored on a machine-readable medium which represents various logic within the processor, which when read by a machine causes the machine to fabricate logic to perform the techniques described herein. Such representations, known as "EP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is an apparatus, comprising circuitry, a communication component for execution by the circuitry to receive a send request identifying a message to be received from an initiator device via a packet transfer process, and transmit an acceptance to grant the send request, and a scheduling component for execution by the circuitry to determine whether to defer the packet transfer process, and in response to a determination to defer the packet transfer process, select a value of a delay parameter to be included in the acceptance.

Example 2 is the apparatus of Example 1, the scheduling component for execution by the circuitry to select a delay duration for the packet transfer process, and select the value of the delay parameter based on the delay duration.

Example 3 is the apparatus of Example 2, the scheduling component for execution by the circuitry to select a value of the delay duration as the value of the delay parameter.

Example 4 is the apparatus of Example 2, the scheduling component for execution by the circuitry to select a delay index based on the delay duration, and select a value of the delay index as the value of the delay parameter.

Example 5 is the apparatus of any of Examples 1 to 4, the scheduling component for execution by the circuitry to select a start time for the packet transfer process, and select the value of the delay parameter based on the selected start time.

Example 6 is the apparatus of Example 5, the scheduling component for execution by the circuitry to use the selected start time as the value of the delay parameter.

Example 7 is the apparatus of any of Examples 1 to 6, the scheduling component for execution by the circuitry to select a scheduling slack for scheduling the packet transfer process, and select the value of the delay parameter based on the scheduling slack.

Example 8 is the apparatus of any of Examples 1 to 7, the communication component for execution by the circuitry to include a deferred transfer indicator in the acceptance.

Example 9 is the apparatus of any of Examples 1 to 8, the send request to comprise a payload size parameter indicating a size of the message.

Example 10 is the apparatus of Example 9, the scheduling component for execution by the circuitry to determine the size of the message based on the payload size parameter, select a receive interval for the packet transfer process based on the size of the message, and select the value of the delay parameter based on the selected receive interval.

Example 11 is the apparatus of Example 10, the scheduling component for execution by the circuitry to select the receive interval for the packet transfer process based on the size of the message and on a receive schedule identifying respective receive intervals for each of one or more other packet transfer processes.

Example 12 is the apparatus of any of Examples 1 to 11, the communication component for execution by the circuitry to receive the send request and transmit the acceptance during a handshake with the initiator device.

Example 13 is the apparatus of Example 12, the handshake to comprise a rendezvous protocol operation.

Example 14 is the apparatus of any of Examples 1 to 13, the send request to comprise a request-to-send (RTS).

Example 15 is the apparatus of any of Examples 1 to 14, the acceptance to comprise a clear-to-send (CTS).

Example 16 is a system, comprising an apparatus according to any of Examples 1 to 15, and at least one network interface.

Example 17 is an apparatus, comprising circuitry, a communication component for execution by the circuitry to transmit a send request identifying a message to be sent to a target device via a packet transfer process, and receive an acceptance granting the send request, and a scheduling component for execution by the circuitry to determine whether the acceptance indicates that the packet transfer process is to be deferred, and in response to a determination that the acceptance indicates that the packet transfer process is to be deferred, delay an initiation of the packet transfer process based on a delay parameter comprised in the acceptance.

Example 18 is the apparatus of Example 17, the scheduling component for execution by the circuitry to identify a delay duration based on the delay parameter, and delay the initiation of the packet transfer process by the delay duration.

Example 19 is the apparatus of Example 18, the scheduling component for execution by the circuitry to identify a value of the delay parameter as the delay duration.

Example 20 is the apparatus of Example 18, the scheduling component for execution by the circuitry to identify a value of the delay parameter as a delay index, and identify a duration corresponding to the delay index as the delay duration.

Example 21 is the apparatus of Example 17, the scheduling component for execution by the circuitry to identify a value of the delay parameter as a start time for the packet transfer process, and delay the initiation of the packet transfer process until the start time.

Example 22 is the apparatus of any of Examples 17 to 21, the scheduling component for execution by the circuitry to determine whether the acceptance indicates that the packet transfer process is to be deferred based on a determination of whether the delay parameter is present within the acceptance.

Example 23 is the apparatus of any of Examples 17 to 21, the scheduling component for execution by the circuitry to determine whether the acceptance indicates that the packet transfer process is to be deferred based on a value of the delay parameter.

Example 24 is the apparatus of any of Examples 17 to 21, the scheduling component for execution by the circuitry to determine whether the acceptance indicates that the packet transfer process is to be deferred based on whether the acceptance comprises a deferred transfer indicator.

Example 25 is the apparatus of any of Examples 17 to 24, the send request to comprise a payload size parameter indicating a size of the message.

Example 26 is the apparatus of any of Examples 17 to 25, the scheduling component for execution by the circuitry to transmit the send request and receive the acceptance during a handshake with the target device.

Example 27 is the apparatus of Example 26, the handshake to comprise a rendezvous protocol operation.

Example 28 is the apparatus of any of Examples 17 to 27, the send request to comprise a request-to-send (RTS).

Example 29 is the apparatus of any of Examples 17 to 28, the acceptance to comprise a clear-to-send (CTS).

Example 30 is a system, comprising an apparatus according to any of Examples 17 to 29, and at least one network interface.

Example 31 is at least one computer-readable storage medium comprising a set of instructions that, in response to being executed on a computing device, cause the computing device to receive a send request identifying a message to be received from an initiator device via a packet transfer process, determine whether to defer the packet transfer process, and in response to a determination to defer the packet transfer process select a value of a delay parameter, and grant the send request by transmitting an acceptance comprising the delay parameter.

Example 32 is the at least one computer-readable storage medium of Example 31, comprising instructions that, in response to being executed on the computing device, cause the computing device to select a delay duration for the packet transfer process, and select the value of the delay parameter based on the delay duration.

Example 33 is the at least one computer-readable storage medium of Example 32, comprising instructions that, in response to being executed on the computing device, cause the computing device to select a value of the delay duration as the value of the delay parameter.

Example 34 is the at least one computer-readable storage medium of Example 32, comprising instructions that, in response to being executed on the computing device, cause the computing device to select a delay index based on the delay duration, and select a value of the delay index as the value of the delay parameter.

Example 35 is the at least one computer-readable storage medium of any of Examples 31 to 34, comprising instructions that, in response to being executed on the computing device, cause the computing device to select a start time for the packet transfer process, and select the value of the delay parameter based on the selected start time.

Example 36 is the at least one computer-readable storage medium of Example 35, comprising instructions that, in response to being executed on the computing device, cause the computing device to use the selected start time as the value of the delay parameter.

Example 37 is the at least one computer-readable storage medium of any of Examples 31 to 36, comprising instructions that, in response to being executed on the computing device, cause the computing device to select a scheduling slack for scheduling the packet transfer process, and select the value of the delay parameter based on the scheduling slack.

Example 38 is the at least one computer-readable storage medium of any of Examples 31 to 37, comprising instructions that, in response to being executed on the computing device, cause the computing device to include a deferred transfer indicator in the acceptance.

Example 39 is the at least one computer-readable storage medium of any of Examples 31 to 38, the send request to comprise a payload size parameter indicating a size of the message.

Example 40 is the at least one computer-readable storage medium of Example 39, comprising instructions that, in response to being executed on the computing device, cause the computing device to determine the size of the message based on the payload size parameter, select a receive interval for the packet transfer process based on the size of the message, and select the value of the delay parameter based on the selected receive interval.

Example 41 is the at least one computer-readable storage medium of Example 40, comprising instructions that, in response to being executed on the computing device, cause the computing device to select the receive interval for the packet transfer process based on the size of the message and on a receive schedule identifying respective receive intervals for each of one or more other packet transfer processes.

Example 42 is the at least one computer-readable storage medium of any of Examples 31 to 41, comprising instructions that, in response to being executed on the computing device, cause the computing device to receive the send request and transmit the acceptance during a handshake with the initiator device.

Example 43 is the at least one computer-readable storage medium of Example 42, the handshake to comprise a rendezvous protocol operation.

Example 44 is the at least one computer-readable storage medium of any of Examples 31 to 43, the send request to comprise a request-to-send (RTS).

Example 45 is the at least one computer-readable storage medium of any of Examples 31 to 44, the acceptance to comprise a clear-to-send (CTS).

Example 46 is at least one computer-readable storage medium comprising a set of instructions that, in response to being executed on a computing device, cause the computing device to transmit a send request identifying a message to be sent to a target device via a packet transfer process, receive an acceptance granting the send request, determine whether the acceptance indicates that the packet transfer process is to be deferred, and in response to a determination that the acceptance indicates that the packet transfer process is to be deferred, delay an initiation of the packet transfer process based on a delay parameter comprised in the acceptance.

Example 47 is the at least one computer-readable storage medium of Example 46, comprising instructions that, in response to being executed on the computing device, cause the computing device to identify a delay duration based on the delay parameter, and delay the initiation of the packet transfer process by the delay duration.

Example 48 is the at least one computer-readable storage medium of Example 47, comprising instructions that, in response to being executed on the computing device, cause the computing device to identify a value of the delay parameter as the delay duration.

Example 49 is the at least one computer-readable storage medium of Example 47, comprising instructions that, in response to being executed on the computing device, cause the computing device to identify a value of the delay parameter as a delay index, and identify a duration corresponding to the delay index as the delay duration.

Example 50 is the at least one computer-readable storage medium of Example 46, comprising instructions that, in response to being executed on the computing device, cause the computing device to identify a value of the delay parameter as a start time for the packet transfer process, and delay the initiation of the packet transfer process until the start time.

Example 51 is the at least one computer-readable storage medium of any of Examples 46 to 50, comprising instructions that, in response to being executed on the computing device, cause the computing device to determine whether the acceptance indicates that the packet transfer process is to be deferred based on a determination of whether the delay parameter is present within the acceptance.

Example 52 is the at least one computer-readable storage medium of any of Examples 46 to 50, comprising instructions that, in response to being executed on the computing device, cause the computing device to determine whether the acceptance indicates that the packet transfer process is to be deferred based on a value of the delay parameter.

Example 53 is the at least one computer-readable storage medium of any of Examples 46 to 50, comprising instructions that, in response to being executed on the computing device, cause the computing device to determine whether the acceptance indicates that the packet transfer process is to be deferred based on whether the acceptance comprises a deferred transfer indicator.

Example 54 is the at least one computer-readable storage medium of any of Examples 46 to 53, the send request to comprise a payload size parameter indicating a size of the message.

Example 55 is the at least one computer-readable storage medium of any of Examples 46 to 54, comprising instructions that, in response to being executed on the computing device, cause the computing device to transmit the send request and receive the acceptance during a handshake with the target device.

Example 56 is the at least one computer-readable storage medium of Example 55, the handshake to comprise a rendezvous protocol operation.

Example 57 is the at least one computer-readable storage medium of any of Examples 46 to 56, the send request to comprise a request-to-send (RTS).

Example 58 is the at least one computer-readable storage medium of any of Examples 46 to 57, the acceptance to comprise a clear-to-send (CTS).

Example 59 is a method, comprising receiving a send request identifying a message to be received from an initiator device via a packet transfer process, determining, by a processor circuit, whether to defer the packet transfer process, and in response to a determination to defer the packet transfer process selecting a value of a delay parameter, and granting the send request by transmitting an acceptance comprising the delay parameter.

Example 60 is the method of Example 59, comprising selecting a delay duration for the packet transfer process, and selecting the value of the delay parameter based on the delay duration.

Example 61 is the method of Example 60, comprising selecting a value of the delay duration as the value of the delay parameter.

Example 62 is the method of Example 60, comprising selecting a delay index based on the delay duration, and selecting a value of the delay index as the value of the delay parameter.

Example 63 is the method of any of Examples 59 to 62, comprising selecting a start time for the packet transfer process, and selecting the value of the delay parameter based on the selected start time.

Example 64 is the method of Example 63, comprising using the selected start time as the value of the delay parameter.

Example 65 is the method of any of Examples 59 to 64, comprising selecting a scheduling slack for scheduling the packet transfer process, and selecting the value of the delay parameter based on the scheduling slack.

Example 66 is the method of any of Examples 59 to 65, comprising including a deferred transfer indicator in the acceptance.

Example 67 is the method of any of Examples 59 to 66, the send request to comprise a payload size parameter indicating a size of the message.

Example 68 is the method of Example 67, comprising determining the size of the message based on the payload size parameter, selecting a receive interval for the packet transfer process based on the size of the message, and selecting the value of the delay parameter based on the selected receive interval.

Example 69 is the method of Example 68, comprising selecting the receive interval for the packet transfer process based on the size of the message and on a receive schedule identifying respective receive intervals for each of one or more other packet transfer processes.

Example 70 is the method of any of Examples 59 to 69, comprising receiving the send request and transmitting the acceptance during a handshake with the initiator device.

Example 71 is the method of Example 70, the handshake to comprise a rendezvous protocol operation.

Example 72 is the method of any of Examples 59 to 71, the send request to comprise a request-to-send (RTS).

Example 73 is the method of any of Examples 59 to 72, the acceptance to comprise a clear-to-send (CTS).

Example 74 is at least one computer-readable storage medium comprising a set of instructions that, in response to being executed on a computing device, cause the computing device to perform a method according to any of Examples 59 to 73.

Example 75 is an apparatus, comprising means for performing a method according to any of Examples 59 to 73.

Example 76 is a system, comprising the apparatus of Example 75, and at least one network interface.

Example 77 is a method, comprising transmitting a send request identifying a message to be sent to a target device via a packet transfer process, receiving an acceptance granting the send request, determining, by a processor circuit, whether the acceptance indicates that the packet transfer process is to be deferred, and in response to a determination that the acceptance indicates that the packet transfer process is to be deferred, delaying an initiation of the packet transfer process based on a delay parameter comprised in the acceptance.

Example 78 is the method of Example 77, comprising identifying a delay duration based on the delay parameter, and delaying the initiation of the packet transfer process by the delay duration.

Example 79 is the method of Example 78, comprising identifying a value of the delay parameter as the delay duration.

Example 80 is the method of Example 78, comprising identifying a value of the delay parameter as a delay index, and identifying a duration corresponding to the delay index as the delay duration.

Example 81 is the method of Example 77, comprising identifying a value of the delay parameter as a start time for the packet transfer process, and delaying the initiation of the packet transfer process until the start time.

Example 82 is the method of any of Examples 77 to 81, comprising determining whether the acceptance indicates that the packet transfer process is to be deferred based on a determination of whether the delay parameter is present within the acceptance.

Example 83 is the method of any of Examples 77 to 81, comprising determining whether the acceptance indicates that the packet transfer process is to be deferred based on a value of the delay parameter.

Example 84 is the method of any of Examples 77 to 81, comprising determining whether the acceptance indicates that the packet transfer process is to be deferred based on whether the acceptance comprises a deferred transfer indicator.

Example 85 is the method of any of Examples 77 to 84, the send request to comprise a payload size parameter indicating a size of the message.

Example 86 is the method of any of Examples 77 to 85, comprising transmitting the send request and receiving the acceptance during a handshake with the target device.

Example 87 is the method of Example 86, the handshake to comprise a rendezvous protocol operation.

Example 88 is the method of any of Examples 77 to 87, the send request to comprise a request-to-send (RTS).

Example 89 is the method of any of Examples 77 to 88, the acceptance to comprise a clear-to-send (CTS).

Example 90 is at least one computer-readable storage medium comprising a set of instructions that, in response to being executed on a computing device, cause the computing device to perform a method according to any of Examples 77 to 89.

Example 91 is an apparatus, comprising means for performing a method according to any of Examples 77 to 89.

Example 92 is a system, comprising the apparatus of Example 91, and at least one network interface.

Example 93 is an apparatus, comprising means for receiving a send request identifying a message to be received from an initiator device via a packet transfer process, means for determining whether to defer the packet transfer process, and means for, in response to a determination to defer the packet transfer process selecting a value of a delay parameter, and granting the send request by transmitting an acceptance comprising the delay parameter.

Example 94 is the apparatus of Example 93, comprising means for selecting a delay duration for the packet transfer process, and means for selecting the value of the delay parameter based on the delay duration.

Example 95 is the apparatus of Example 94, comprising means for selecting a value of the delay duration as the value of the delay parameter.

Example 96 is the apparatus of Example 94, comprising means for selecting a delay index based on the delay duration, and means for selecting a value of the delay index as the value of the delay parameter.

Example 97 is the apparatus of any of Examples 93 to 96, comprising means for selecting a start time for the packet transfer process, and means for selecting the value of the delay parameter based on the selected start time.

Example 98 is the apparatus of Example 97, comprising means for using the selected start time as the value of the delay parameter.

Example 99 is the apparatus of any of Examples 93 to 98, comprising means for selecting a scheduling slack for scheduling the packet transfer process, and means for selecting the value of the delay parameter based on the scheduling slack.

Example 100 is the apparatus of any of Examples 93 to 99, comprising means for including a deferred transfer indicator in the acceptance.

Example 101 is the apparatus of any of Examples 93 to 100, the send request to comprise a payload size parameter indicating a size of the message.

Example 102 is the apparatus of Example 101, comprising means for determining the size of the message based on the payload size parameter, means for selecting a receive interval for the packet transfer process based on the size of the message, and means for selecting the value of the delay parameter based on the selected receive interval.

Example 103 is the apparatus of Example 102, comprising means for selecting the receive interval for the packet transfer process based on the size of the message and on a receive schedule identifying respective receive intervals for each of one or more other packet transfer processes.

Example 104 is the apparatus of any of Examples 93 to 103, comprising means for receiving the send request and transmitting the acceptance during a handshake with the initiator device.

Example 105 is the apparatus of Example 104, the handshake to comprise a rendezvous protocol operation.

Example 106 is the apparatus of any of Examples 93 to 105, the send request to comprise a request-to-send (RTS).

Example 107 is the apparatus of any of Examples 93 to 106, the acceptance to comprise a clear-to-send (CTS).

Example 108 is a system, comprising an apparatus according to any of Examples 93 to 107, and at least one network interface.

Example 109 is an apparatus, comprising means for transmitting a send request identifying a message to be sent to a target device via a packet transfer process, means for receiving an acceptance granting the send request, means for determining whether the acceptance indicates that the packet transfer process is to be deferred, and means for, in response to a determination that the acceptance indicates that the packet transfer process is to be deferred, delaying an initiation of the packet transfer process based on a delay parameter comprised in the acceptance.

Example 110 is the apparatus of Example 109, comprising means for identifying a delay duration based on the delay parameter, and means for delaying the initiation of the packet transfer process by the delay duration.

Example 111 is the apparatus of Example 110, comprising means for identifying a value of the delay parameter as the delay duration.

Example 112 is the apparatus of Example 110, comprising means for identifying a value of the delay parameter as a delay index, and means for identifying a duration corresponding to the delay index as the delay duration.

Example 113 is the apparatus of Example 109, comprising means for identifying a value of the delay parameter as a start time for the packet transfer process, and means for delaying the initiation of the packet transfer process until the start time.

Example 114 is the apparatus of any of Examples 109 to 113, comprising means for determining whether the acceptance indicates that the packet transfer process is to be deferred based on a determination of whether the delay parameter is present within the acceptance.

Example 115 is the apparatus of any of Examples 109 to 113, comprising means for determining whether the acceptance indicates that the packet transfer process is to be deferred based on a value of the delay parameter.

Example 116 is the apparatus of any of Examples 109 to 113, comprising means for determining whether the acceptance indicates that the packet transfer process is to be deferred based on whether the acceptance comprises a deferred transfer indicator.

Example 117 is the apparatus of any of Examples 109 to 116, the send request to comprise a payload size parameter indicating a size of the message.

Example 118 is the apparatus of any of Examples 109 to 117, comprising means for transmitting the send request and receiving the acceptance during a handshake with the target device.

Example 119 is the apparatus of Example 118, the handshake to comprise a rendezvous protocol operation.

Example 120 is the apparatus of any of Examples 109 to 119, the send request to comprise a request-to-send (RTS).

Example 121 is the apparatus of any of Examples 109 to 120, the acceptance to comprise a clear-to-send (CTS).

Example 122 is a system, comprising an apparatus according to any of Examples 109 to 121, and at least one network interface.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   circuitry;
   a memory storing instructions for execution by the circuitry to:
      receive, by a transport layer entity of the apparatus, a send request identifying a message to be received from a transport layer entity of an initiator device via a packet transfer process via a connectivity fabric of a network;
      transmit an acceptance to grant the send request;
      determine whether to defer the packet transfer process based on whether the message will be interleaved during the packet transfer process of the message, the message to be interleaved based on a number of ongoing packet transfer processes and a number of scheduled packet transfer processes at the apparatus; and
      in response to a determination to defer the packet transfer process, select a value of a delay parameter to be included in the acceptance.

2. The apparatus of claim 1, the memory storing instructions for execution by the circuitry to:
   determine a size of the message based on a payload size parameter comprised in the send request;
   partition the message into a plurality of data segments based on the size of the message;
   select a receive interval for the packet transfer process based on the size of the message; and
   select the value of the delay parameter based on the selected receive interval.

3. The apparatus of claim 2, the memory storing instructions for execution by the circuitry to select the receive interval for the packet transfer process based on the size of the message and on a receive schedule identifying respective receive intervals for each of one or more other packet transfer processes, at least one of the send request, the message, or the acceptance to comprise application-layer messages sent via the connectivity fabric of the network.

4. The apparatus of claim 1, the delay parameter to indicate a delay duration for the packet transfer process, the delay duration determined based on a difference between a next available receive time and a current time.

5. The apparatus of claim 1, the delay parameter to indicate a start time for the packet transfer process.

6. The apparatus of claim 1, the memory storing instructions for execution by the circuitry to:
   select a scheduling slack for scheduling the packet transfer process based on at least one of an amount of time required for the acceptance to be received at the initiator device or one or more other packets to be received at the initiator device; and
   select the value of the delay parameter based on the scheduling slack.

7. The apparatus of claim 6, the memory storing instructions for execution by the circuitry to receive the send request and transmit the acceptance during a handshake with the initiator device.

8. An apparatus, comprising:
   circuitry;
   a memory storing instructions for execution by the circuitry to:
      transmit, by a transport layer entity of the apparatus, a send request identifying a message to be sent to a transport layer entity of a target device via a packet transfer process via a connectivity fabric of a network;
      receive an acceptance granting the send request;
      determine whether the acceptance indicates that the packet transfer process is to be deferred based on whether the message will be interleaved during the packet transfer process of the message, the message to be interleaved based on a number of ongoing packet transfer processes and a number of scheduled packet transfer processes at the target device; and
      in response to a determination that the acceptance indicates that the packet transfer process is to be deferred, delay an initiation of the packet transfer process based on a delay parameter comprised in the acceptance.

9. The apparatus of claim 8, the memory storing instructions for execution by the circuitry to:
   identify a delay duration based on the delay parameter; and
   delay the initiation of the packet transfer process by the delay duration.

10. The apparatus of claim 8, the for memory storing instructions execution by the circuitry to:
    identify a value of the delay parameter as a start time for the packet transfer process; and
    delay the initiation of the packet transfer process until the start time.

11. The apparatus of claim 8, the memory storing instructions for execution by the circuitry to determine whether the acceptance indicates that the packet transfer process is to be deferred based on a determination of whether the delay parameter is present within the acceptance, at least one of the send request, the message, or the acceptance to comprise application-layer messages sent via the connectivity fabric of the network.

12. The apparatus of claim 8, the memory storing instructions for execution by the circuitry to determine whether the acceptance indicates that the packet transfer process is to be deferred based on a value of the delay parameter.

13. The apparatus of claim 8, the memory storing instructions for execution by the circuitry to determine whether the acceptance indicates that the packet transfer process is to be deferred based on whether the acceptance comprises a deferred transfer indicator.

14. The apparatus of claim 8, the memory storing instructions for execution by the circuitry to transmit the send request and receive the acceptance during a handshake with the target device.

15. At least one non-transitory computer-readable storage medium comprising a set of instructions that, in response to being executed on a computing device, cause the computing device to:
    receive, by a transport layer entity of the computing device, a send request identifying a message to be received from a transport layer entity of an initiator device via a packet transfer process via a connectivity fabric of a network;
    determine whether to defer the packet transfer process; and
    in response to a determination to defer the packet transfer process based on whether the message will be interleaved during the packet transfer process of the message, the message to be interleaved based on a number of ongoing packet transfer processes and a number of scheduled packet transfer processes at the computing device:
  select a value of a delay parameter; and
  grant the send request by transmitting an acceptance comprising the delay parameter.

16. The at least one non-transitory computer-readable storage medium of claim 15, comprising instructions that, in response to being executed on the computing device, cause the computing device to:
  determine a size of the message based on a payload size parameter comprised in the send request;
  partition the message into a plurality of data segments based on the size of the message;
  select a receive interval for the packet transfer process based on the size of the message; and
  select the value of the delay parameter based on the selected receive interval.

17. The at least non-transitory one computer-readable storage medium of claim 16, comprising instructions that, in response to being executed on the computing device, cause the computing device to select the receive interval for the packet transfer process based on the size of the message and on a receive schedule identifying respective receive intervals for each of one or more other packet transfer processes, at least one of the send request, the message, or the acceptance to comprise application-layer messages sent via the connectivity fabric of the network.

18. The at least one non-transitory computer-readable storage medium of claim 15, the delay parameter to indicate a delay duration for the packet transfer process, the delay duration determined based on a difference between a next available receive time and a current time.

19. The at least one non-transitory computer-readable storage medium of claim 15, the delay parameter to indicate a start time for the packet transfer process.

20. The at least one non-transitory computer-readable storage medium of claim 15, comprising instructions that, in response to being executed on the computing device, cause the computing device to:
  select a scheduling slack for scheduling the packet transfer process based on at least one of an amount of time required for the acceptance to be received at the initiator device or one or more other packets to be received at the initiator device; and
  select the value of the delay parameter based on the scheduling slack.

21. At least one non-transitory computer-readable storage medium comprising a set of instructions that, in response to being executed on a computing device, cause the computing device to:
  transmit, by a transport layer entity of the computing device, a send request identifying a message to be sent to a transport layer entity of a target device via a packet transfer process via a connectivity fabric of a network;
  receive an acceptance granting the send request;
  determine whether the acceptance indicates that the packet transfer process is to be deferred based on whether the message will be interleaved during the packet transfer process of the message, the message to be interleaved based on a number of ongoing packet transfer processes and a number of scheduled packet transfer processes at the target device; and
  in response to a determination that the acceptance indicates that the packet transfer process is to be deferred, delay an initiation of the packet transfer process based on a delay parameter comprised in the acceptance.

22. The at least one non-transitory computer-readable storage medium of claim 21, comprising instructions that, in response to being executed on the computing device, cause the computing device to:
  identify a delay duration based on the delay parameter; and
  delay the initiation of the packet transfer process by the delay duration.

23. The at least one non-transitory computer-readable storage medium of claim 21, comprising instructions that, in response to being executed on the computing device, cause the computing device to:
  identify a value of the delay parameter as a start time for the packet transfer process; and
  delay the initiation of the packet transfer process until the start time.

24. The at least one non-transitory computer-readable storage medium of claim 21, comprising instructions that, in response to being executed on the computing device, cause the computing device to determine whether the acceptance indicates that the packet transfer process is to be deferred based on a determination of whether the delay parameter is present within the acceptance, one or more of the send request, the message, or the acceptance to comprise application-layer messages sent via the connectivity fabric of the network.

25. The at least one non-transitory computer-readable storage medium of claim 21, comprising instructions that, in response to being executed on the computing device, cause the computing device to determine whether the acceptance indicates that the packet transfer process is to be deferred based on a value of the delay parameter.

* * * * *